(12) United States Patent
Kim et al.

(10) Patent No.: US 8,761,690 B2
(45) Date of Patent: Jun. 24, 2014

(54) METHOD OF OPERATING RELAY STATION IN WIRELESS COMMUNICATION SYSTEM

(75) Inventors: Byoung-Hoon Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 1129 days.

(21) Appl. No.: 12/453,439

(22) Filed: May 11, 2009

(65) Prior Publication Data
US 2010/0035541 A1    Feb. 11, 2010

Related U.S. Application Data

(60) Provisional application No. 61/087,782, filed on Aug. 11, 2008.

(30) Foreign Application Priority Data

Sep. 22, 2008    (KR) .......................... 10-2008-0092928

(51) Int. Cl.
*H04B 1/38* (2006.01)
(52) U.S. Cl.
USPC ............. 455/90; 455/7; 455/67.13; 455/11.1; 455/13.1; 455/13.3; 455/16; 455/552
(58) Field of Classification Search
CPC .. H04B 7/15557; H04B 7/2606; H04W 88/04
See application file for complete search history.

(56) References Cited

U.S. PATENT DOCUMENTS

| | | | | |
|---|---|---|---|---|
| 7,436,825 | B2 * | 10/2008 | Jeong et al. | 370/386 |
| 8,055,213 | B2 * | 11/2011 | Hui et al. | 455/100 |
| 2001/0029191 | A1 * | 10/2001 | Wilhelm | 455/552 |
| 2004/0179552 | A1 * | 9/2004 | Palm | 370/480 |
| 2005/0096053 | A1 * | 5/2005 | Liu et al. | 455/439 |
| 2006/0239222 | A1 | 10/2006 | Kim et al. | |
| 2007/0190934 | A1 * | 8/2007 | Kim et al. | 455/7 |
| 2008/0009243 | A1 * | 1/2008 | Hart | 455/67.13 |
| 2009/0029645 | A1 * | 1/2009 | Leroudier | 455/7 |
| 2009/0147731 | A1 * | 6/2009 | Chion et al. | 370/328 |
| 2010/0027457 | A1 * | 2/2010 | Okuda | 370/315 |

FOREIGN PATENT DOCUMENTS

| | | | |
|---|---|---|---|
| EP | 1843488 A1 | * | 10/2007 |
| WO | WO 2006090669 A1 | * | 8/2006 |

OTHER PUBLICATIONS

Vajapeyam et al., "A Hybrid Space-Time Coding Scheme for Cooperative Networks", Communications, control and computing (Annual Allerton Conference), 2004, pp. 1506-1515.

* cited by examiner

*Primary Examiner* — Fayyaz Alam
*Assistant Examiner* — Mohammed Rachedine
(74) *Attorney, Agent, or Firm* — Mckenna, Long & Aldridge, LLP.

(57) ABSTRACT

A method of operating a relay station in a wireless communication system is provided. The method comprises the steps of determining a relay mode and transmitting a signal, received from a source station, to a destination station in the determined relay mode, wherein the relay mode is determined based on at least one of requirements for quality of service (QoS) of traffic, the number of times in which attempts are made to transmit a packet, and an amount of packets stored in a buffer of the relay station.

5 Claims, 12 Drawing Sheets

METHOD OF OPERATING RELAY STATION IN WIRELESS COMMUNICATION SYSTEM

CROSS-REFERENCE TO RELATED APPLICATIONS

This application claims the benefit of priority of U.S. Provisional Application No. 61/087,782 filed on Aug. 11, 2008, and Korean Patent Application No. 10-2008-0092928 filed on Sep. 22, 2008, which are incorporated by reference in their entirety herein.

BACKGROUND

1. Technical Field

The present invention relates to wireless communication, and more particularly, to a method of operating a relay station in a wireless communication system using the relay station.

2. Related Art

IEEE (Institute of Electrical and Electronics Engineers) 802.16 standard provides a technology and protocol for supporting broadband wireless access. IEEE 802.16-2001 had been standardized since 1999 and approved in 2001. This is based on a single carrier physical layer called 'WirelessMAN-SC'. In IEEE 802.16a standard approved in 2003, 'WirelessMAN-OFDM' and 'WirelessMAN-OFDMA' other than the 'WirelessMAN-SC' were further added to the physical layer. After the IEEE 802.16a standard was completed, revised IEEE 802.16-2004 standard was approved in 2004. In order to modify bugs and error of the IEEE 802.16-2004 standard, IEEE 802.16-2004/Cor1 (hereinafter referred to as IEEE 802.16e) was completed in 2005 in the form of 'corrigendum'.

Today, in a draft by a IEEE 802.16 Task Group j, which is referred to as IEEE 802.16j, a relay station has been introduced and standardized in order to provide coverage extension and throughput enhancement on the basis of the IEEE 802.16e. In the IEEE 802.16j standard, signals can be transferred to a mobile station outside the coverage of a base station through the relay station so as to provide coverage extension. In addition, a channel having high reliability can be provided to a mobile station inside the coverage of a base station. High adaptive modulation and coding (AMC) scheme can be established so as to increase the system capacity.

Relay modes in which a relay station relays signals between a base station and a mobile station include an amplify and forward (AF) mode and a decode and forward (DF) mode. In the AF mode, the relay station amplifies a signal received from a base station or a mobile station and transfers the amplified signal to the mobile station or the base station. In the DF mode, the relay station reproduces information bits from signals received from a base station or a mobile station through processes such as demodulation and decoding, regenerates a signal through processes such as encoding and modulation, and transfers the generated signal to the mobile station or the base station.

The AF mode is advantageous in that time delay taken to transfer signals is short, but disadvantageous in that noise is propagated into or amplified in transferred signals. On the contrary, the DF mode is advantageous in that noise included in signals can be removed and reliability of transferred signals can be increased, but disadvantageous in that time delay taken to transfer signals is long since demodulation and decoding processes are performed.

Accordingly, there is a need for a method of transferring signals using an adequate relay mode depending on conditions.

SUMMARY

The present invention provides relay mode decision criteria to a relay station in a wireless communication system.

The present invention also provides a method of operating a relay station according to a relay mode, which is selected dynamically, in a wireless communication system.

The present invention also provides a method of operating a relay station, which can reduce time delay while maintaining reliability of signal transfer in a wireless communication system.

In one aspect, the present invention provides a method of operating a relay station in a wireless communication system, the method comprising the steps of determining a relay mode and transmitting a signal, received from a source station, to a destination station in the determined relay mode, wherein the relay mode is determined based on at least one of requirements for quality of service (QoS) of traffic, the number of times in which attempts are made to transmit a packet, and an amount of packets stored in a buffer of the relay station.

The method may further comprise informing at least one of the source station and the destination station of the determined relay mode.

The relay mode may include an amplify and forward (AF) mode and a decode and forward (DF) mode, and the AF mode includes a step of storing the signal received from the source station, and then amplifying and transferring the signal, or a step of amplifying the signal, which is received from the source station, without storing the signal and then transferring the signal.

In another aspect, the present invention provides a method of operating a relay station in a wireless communication system, the method comprising the steps of transmitting a first message, including a list of operable relay modes, to a source station or a destination station, receiving a second message including a relay mode selected by the source station or the destination station and transmitting a signal, received from the source station, to the destination station in the relay mode included in the second message.

In another aspect, the present invention provides a method of determining a relay mode in a wireless communication system, the method comprising the steps of receiving a list of operable relay modes, determining one of the modes included in the list as a relay mode and informing a relay station of the determined relay mode, wherein the relay mode is determined based on at least one of requirements for quality of service (QoS) of traffic, the number of times in which attempts are made to transmit a packet, and an amount of packets stored in a buffer of the relay station.

The list of the relay modes may include an AF mode and a DF mode, and the AF mode includes a method of storing the signal received from the source station, and then amplifying and transferring the signal, or a method of amplifying the signal, which is received from the source station, without storing the signal and then transferring the signal.

The list of the relay modes may include an AF mode and a DF mode, and the AF mode includes a method of storing the signal received from the source station, and then amplifying and transferring the signal, and a method of amplifying the signal, which is received from the source station, without storing the signal and then transferring the signal.

In another aspect, the present invention provides a method of operating a relay station in a wireless communication system, the method comprising the steps of selecting one of an AF mode and a DF mode based on requirements for QoS of traffic and transmitting a signal, which is received from a source station, to a destination station in the selected relay mode.

The requirements for QoS of the traffic may include requirements for time delay of the traffic.

If the traffic requires low time delay, the AF mode may be selected, and if the traffic allows high time delay, the DF mode may be selected.

The relay mode may be selected by further considering the number of relay station between a mobile station and a base station.

In another aspect, the present invention provides a method of selecting a relay mode in a wireless communication system, the method comprising the steps of selecting one of an AF mode and a DF mode based on requirements for QoS of traffic and informing a relay station of the selected relay mode.

The relay station may be informed of the selected relay mode at least one of a point of time at which a mobile station enters a network, a point of time at which traffic connection is set up and each point of time at which a packet is transmitted.

In another aspect, the present invention provides a method of operating a relay station in a wireless communication system, the method comprising the steps of transmitting a packet, which is received from a source station, to a destination station in an AF mode, receiving a re-transmission request message with respect to a packet from the source station or the destination station and retransmitting the packet to the destination station in a DF mode.

The method may further comprise the step of, after the packet is transmitted to the destination station in the AF mode, preparing to retransmit the packet to the destination station in the DF mode.

In another aspect, the present invention provides a method of operating a relay station in a wireless communication system, the method comprising the steps of detecting error in a packet received from a source station, if error is detected in the packet, requesting the source station to retransmit the packet and when the packet is received from the source station again, transmitting the packet to a destination station in an AF mode.

In another aspect, the present invention provides a method of operating a relay station in a wireless communication system, the method comprising the steps of receiving packets from source stations, transmitting the packets to destination stations in a DF mode and if packets received from the source stations are stacked in a buffer to a certain amount, transmitting all or some of the packets to the destination station in an AF mode.

In the case in which some of the packets are transmitted to the destination station in the AF mode, some of the packets may be decided based on at least one of a priority of traffic, a channel status, QoS requirements and delay time in the buffer of the relay station.

In another aspect, the present invention provides a method of operating a relay station in a wireless communication system, the method comprising the steps of receiving packets from source stations, transmitting the packets to destination stations in a DF mode and if packets received from the source stations are stacked in a buffer to a certain amount, transmitting a relay mode switchover request message to the source station or the destination station.

The method may further comprises the steps of receiving a relay mode switchover message, instructing that all or some of the packets be transmitted in an AF mode, from the source stations or the destination stations and transmitting all or some of the packets to the destination stations in the AF mode in accordance with the relay mode switchover message.

In another aspect, the present invention provides a method of switching over a relay mode in a wireless communication system, the method comprising the steps of transmitting packets to a relay station, receiving a relay mode switchover request message from the relay station and transmitting a relay mode switchover message to instruct that all or some of packets stacked in a buffer of the relay station be transmitted to a destination station in an AF mode.

In the case in which it is instructed to transmit some of the packets to the destination station in the AF mode, some of the packets may be decided based on at least one of a priority of traffic, a channel status, QoS requirements and delay time in the buffer of the relay station.

In another aspect, the present invention provides a relay station of a wireless communication system, comprising a first buffer for storing packets received from source stations, a decoder for decoding the packets stored in the first buffer, an encoder for encoding the packets decoded through the decoder and a second buffer for storing the packets encoded through the encoder in order for the packets to be transmitted to a destination station, wherein the first buffer comprises a buffer controller, and the buffer controller dynamically decides a relay mode in consideration of an amount of packets stored in the first buffer.

If the amount of packets stored in the first buffer is a certain amount or less, the buffer controller may transfer the packets to the decoder, and if the amount of packets stored in the first buffer is a certain amount or more, the buffer controller may transfer all or some of the packets to the second buffer.

Criteria for dynamically selecting a relay mode depending on conditions and a method of operating a relay station are provided. Accordingly, time delay can be reduced while maintaining reliability of signal transfer.

An adequate level of Quality of Service (QoS) can be provided to each user, time delay depending on the retransmission of packets can be reduced, and excessive load on a relay station can be prevented.

DESCRIPTION OF EXEMPLARY EMBODIMENTS

Figure 1:
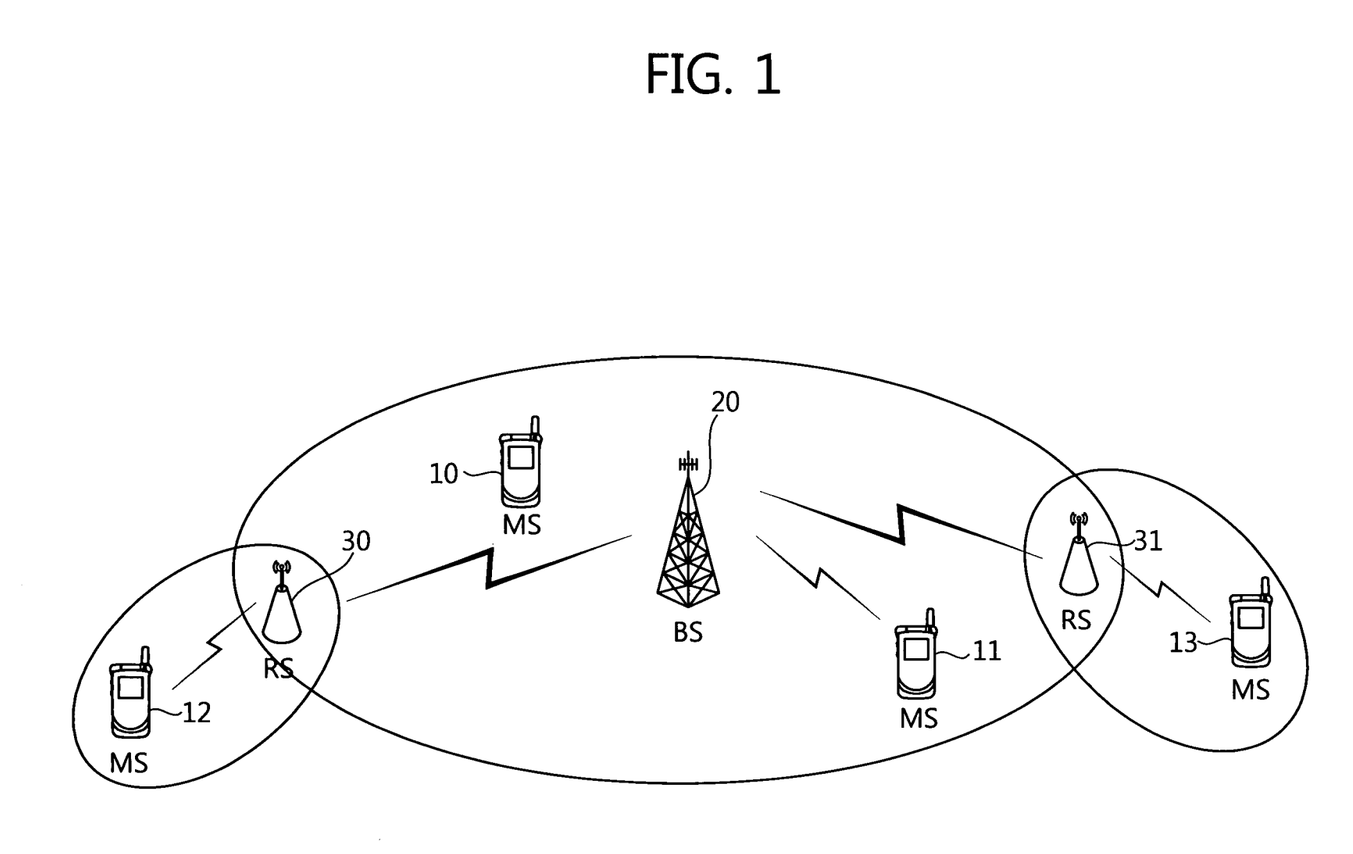
FIG. 1 is a diagram showing a wireless communication system using a relay station.

FIG. 1 is a diagram showing a wireless communication system using a relay station. Wireless communication systems are widely deployed in order to provide a variety of communication services such as voice and packet data.

Referring to FIG. 1, a wireless communication system includes mobile stations (MSs) 10, 11, 12, and 13, a base station (BS) 20, and relay stations (RS) 30 and 31. The MSs 10, 11, 12, and 13 may be fixed or mobile and referred to as another terminology such as a user equipment (UE), a user terminal (UT), a subscriber station (SS) or a wireless device. The BS 20 generally refers to a fixed station that communicates with the MSs 10, 11, 12, and 13 and may be referred to as another terminology such as a Node-B, a base transceiver system (BTS) or an access point. One or more cells may exist in one base station 20. The relay stations (RSs) 30 and 31 are adapted to improve the transmission rate according to coverage extension or the diversity effect and are located between the MSs and the BS. That is, the MSs 10 and 11 within the coverage of the BS 20 may directly communicate with the BS 20, and the MSs 12 and 13 outside the coverage of the BS 20 communicate with the BS 20 through the relay stations 30 and 31. Alternatively, although the MSs 10 and 11 exist within the coverage of the BS 20, they may communicate with the BS 20 through the RSs 30 and 31 in order to improve the transmission rate according to the diversity effect.

Hereinafter, downlink (DL) refers to communication from the BS 20 to the MS 10, and uplink (UL) refers to communication from the MS 10 to the BS 20. Accordingly, in the DL, a source station is the BS 20 and a destination station is the MS 10. In the UL, a source station is the MS 10 and a destination station is the BS 20. In the DL, a transmitter may be part of the BS 20 and a receiver may be part of the MS 10. In the UL, a transmitter may be part of the MS 10 and a receiver may be part of the BS 20.

The wireless communication system may be an orthogonal frequency division multiplexing (OFDM)/orthogonal frequency division multiple access (OFDMA)-based system. OFDM employs a plurality of orthogonal subcarriers. OFDM employs an orthogonal characteristic between inverse fast Fourier transform (IFFT) and fast Fourier transform (FFT). Data is transmitted from a transmitter after experiencing IFFT. In a receiver, original data is restored by performing FFT on a received signal. A transmitter uses IFFT to combine multi-subcarriers, and a receiver uses FFT corresponding to the IFFT in order to separate the multi-subcarriers.

Operating modes of a RS includes a decode-and-forward (DF) mode and an amplify-and-forward (AF) mode. In the DF mode, a RS can perform processes, such as demodulation, channel decoding and error check, on a signal received from a source station in order to restore transmission information therefrom, and then relays the signal, which are generated through channel encoding and modulation, to a destination station. In AF mode, a RS amplifies a signal received from a source station and relays the amplified signal to a destination station. In this case, there may be two types in the AF mode. One is to store a signal received from a source station for a specific period of time, amplify the signal and relay the amplified signal to a destination station. The other is a simple repeater type which is to amplify a signal received from a source station without storing it and relay the amplified signal to a destination station.

The DF mode is advantageous in that it can remove noise, increase reliability of signal transfer because it can check whether there is error, and change a channel encoding and demodulation method in a RS, but is disadvantageous in that it has time delay. On the contrary, the AF mode is advantageous in that the operation of a RS is simple and time delay can be reduced. Among the two types of AF modes, the repeater type AF mode does not have time delay in the Medium Access Control (MAC) layer because the received signal can be transmitted to a destination station within a cyclic prefix (CP) of OFDM. Further, the AF mode in which the received signal is stored for a specific period of time and then transmitted has less time delay than the DF mode. However, the AF mode is disadvantageous in that it cannot remove noise included in signals and check whether there is error in the signals.

Figure 2:
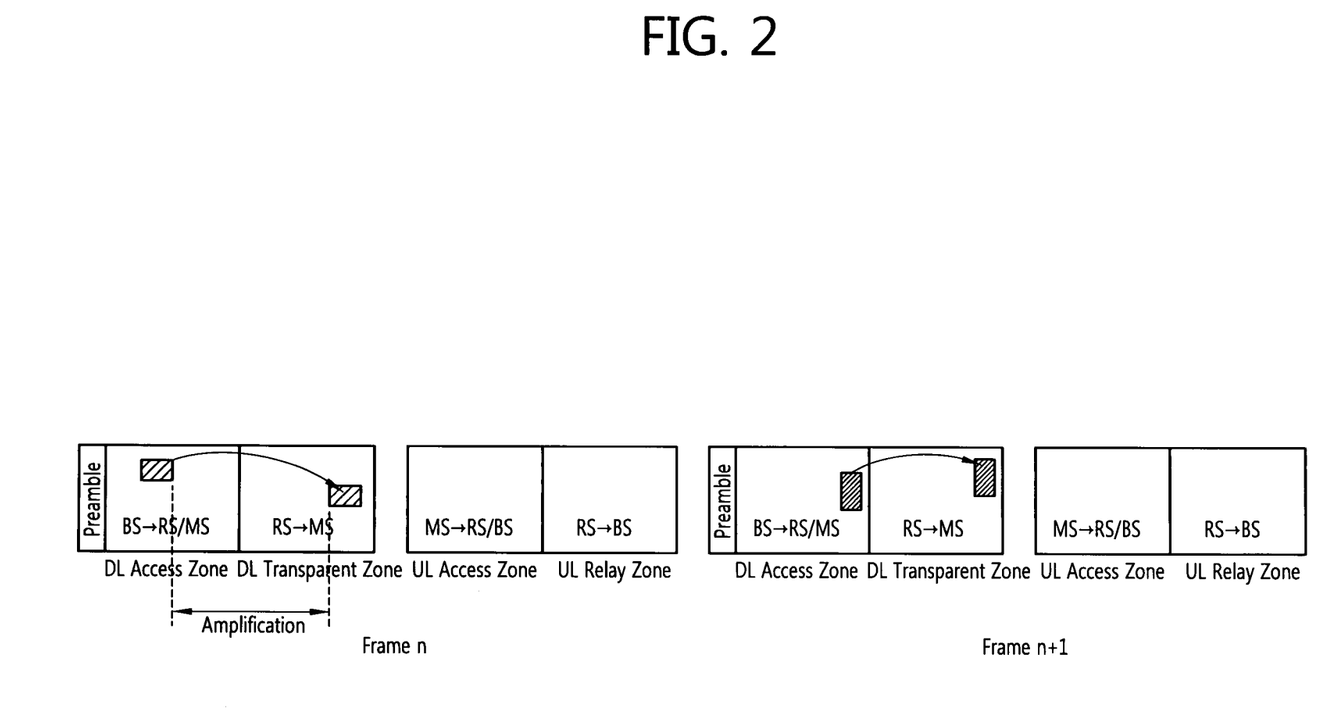
FIG. 2 is a diagram showing a relay procedure according to the AF mode.
Figure 3:
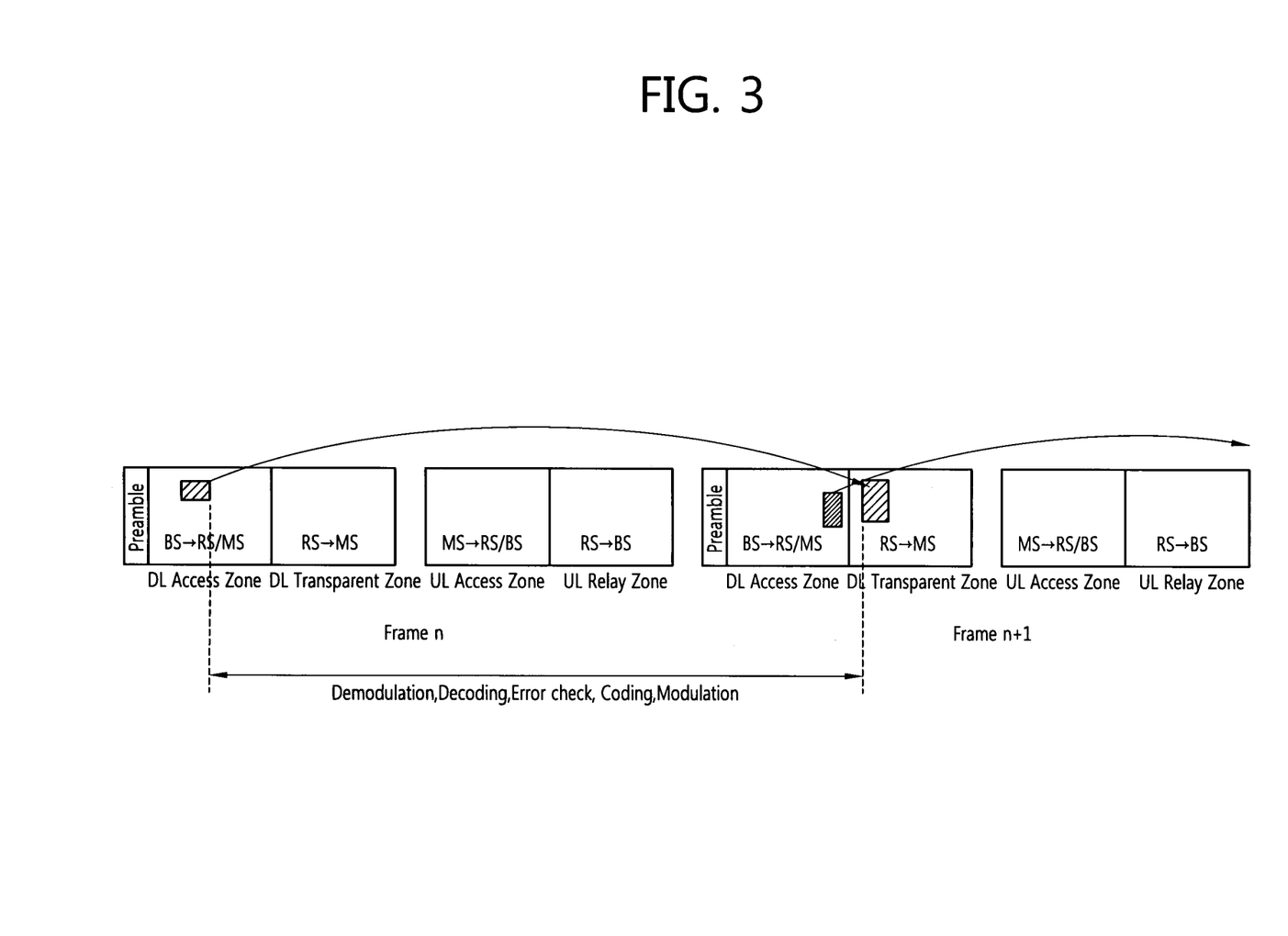
FIG. 3 is a diagram showing a relay procedure according to the DF mode.

FIG. 2 is a diagram showing a relay procedure according to the AF mode. FIG. 3 is a diagram showing a relay procedure according to the DF mode. FIGS. 2 and 3 illustrate the transparent mode of the IEEE 802.16j.

Referring to FIGS. 2 and 3, a frame n is temporally anterior to a frame n+1. A frame includes a DL zone and an UL zone. The DL zone includes a DL access zone and a DL transparent zone, and the UL zone includes an UL access zone and an UL relay zone. The DL access zone is a zone in which a BS transmits a signal to a RS or a MS, and the DL transparent zone is a zone in which a RS transmits a signal to a MS. The UL access zone is a zone in which a MS transmits a signal to a RS or a BS, and the UL relay zone is a zone in which a RS transmits a signal to a BS.

In FIG. 2, when the BS transfers a signal to the RS through the DL access zone of the frame n, the RS transfers the signal to the MS through the DL transparent zone of the frame n. Further, when the BS transfers a signal to the RS through the DL access zone of the frame n+1, the RS transfers the signal to the MS through the DL transparent zone of the frame n+1. In the AF mode, the RS only amplifies a signal received from the BS and then transfers the amplified signal to the MS. Accordingly, a signal can be transferred within the same frame without additional time delay. FIG. 2 shows an example of one of the two types of the AF mode in which a received signal is stored and amplified. In the repeater type AF mode, unlike the above method, when the BS transfers a signal to the RS through the DL access zone of the frame n, the RS transfers a signal to the MS through the DL access zone of the frame n.

On the contrary, in FIG. 3, when the BS transfers a signal to the RS through the DL access zone of the frame n, the RS transfers a signal to the MS through the DL transparent zone of the frame n+1. In the DF mode, the RS performs demodulation, decoding, and error check on a signal received from the BS, and then encodes and modulates the resulting signal, so additional time delay occurs. Further, the size of a signal may vary as a coding and modulation scheme is changed.

In order to supplement the characteristics of the AF mode and DF mode, attempts are made to use a mixed AF mode and DF mode. For example, there are (1) a hybrid AF/DF method of, when a CRC process on a signal received by the RS is successful, transferring the signal in the DF mode and, when a CRC process on a signal received by the RS is unsuccessful, transferring the signal in the AF mode, (2) a method of calculating an error probability or an Eigenvalue using a channel status and selecting one of the AF mode and the DF mode, which has a higher successful transfer rate and a higher achievable channel capacity, and (3) a method of allowing a RS, having transceivers operating in different frequency bands, to amplify a signal received at one of the two frequency bands into the other frequency band and then transfer the amplified signal. In the method (3), a mode changes to the AF mode when there is an additional instruction while basically operating in the DF mode.

In this case, the methods (1) and (2) employ whether the restoration of information is successful and a channel characteristic as criteria for selecting the relay mode. The method (3) has no clear criterion in switching the relay mode. Further, according to the method (3), there is no suggestion of a case in which the transceiver of the RS operates in a single frequency band.

There is a need for a method and criteria for determining the relay mode, which may realize the advantages in which time delay of the AF mode may be minimized, and information restoration and reliable transfer of the DF mode may be maximized. Hereinafter, a method and criteria for determining the relay mode in accordance with an embodiment of the present invention are described. The relay mode may be determined by any one of a RS, a source station and a destination station.

First, a case in which a RS determines the relay mode is described. The RS may determine one of the AF mode and the DF mode as the relay mode. The RS may determine the relay mode in consideration of at least one of i) QoS requirements of traffic, ii) the number of times in which the RS attempts to transmit a packet, and iii) the amount of packets that wait for being decoded in the RS. The RS may transmit a signal, received from a source station, to a destination station in the determined relay mode. In this case, if the relay mode determined by the RS is the AF mode, the RS amplifies the signal received from the source station and then transmits the amplified signal to the destination station. If the relay mode determined by the RS is the DF mode, the RS performs demodulation, decoding, error check, encoding, modulation, etc. on the signal received from the source station and then transmits the resulting signal to the destination station. In addition, the RS may inform the source station and/or the destination station of the determined relay mode.

The RS may reduce time delay taken to transmit a signal while maintaining reliability of the signal transfer because it determines the relay mode by taking at least one of the facts i), ii) and iii) into consideration. In this case, there is no limit of the time to determine the relay mode and the time to receive a signal from the source station. That is, a signal may be received from the source station after the relay mode is determined, and the relay mode may be determined after a signal is received from the source station.

How the source station or the destination station determines the relay mode is described below. The source station or the destination station receives a list of operable relay modes from the RS and determines one of the relay modes included in the list. In this case, the source station or the destination station may determine the relay mode by taking at least one of i) QoS requirements of traffic, ii) the number of times in which the RS attempts to transmit a corresponding packet, and iii) the amount of packets that wait for being decoded in the RS into consideration. The source station or the destination station may determine the relay mode on a user basis and also determine the relay mode on a traffic or packet basis. The source station or the destination station may inform the RS of a determined relay mode. The source station or the destination station may periodically inform the RS of the relay mode. The RS transmits a signal, received from the source station, to the destination station in the relay mode received from the source station or the destination station.

The source station or the destination station may reduce time delay taken to transmit a signal while maintaining reliability of the signal transfer because it determines the relay mode by taking at least one of the facts i), ii) and iii) into consideration.

The criteria for determining the relay mode may include the three facts. The RS (or source station/destination station) may take at least one of i) QoS requirements of traffic, ii) the number of times in which the RS attempts to transmit a corresponding packet, and iii) the amount of packets that wait for being decoded in the RS in order to determine the relay mode.

Hereinafter, according to an embodiment of the present invention, a method of determining the relay mode in which the three facts i), ii) and iii) are taken into consideration is described in detail. For clarity, it is assumed that a RS determines the relay mode.

<Relay Mode Based on QoS Requirements>

A RS may determine a relay mode by taking QoS requirements of traffic into consideration. In particular, the relay mode may be determined by considering the requirements of time delay of traffic. In the case of traffic requiring low time delay, the AF mode may be determined as the relay mode, and, in the case of traffic requiring high time delay, the DF mode may be determined as the relay mode.

Figure 4:
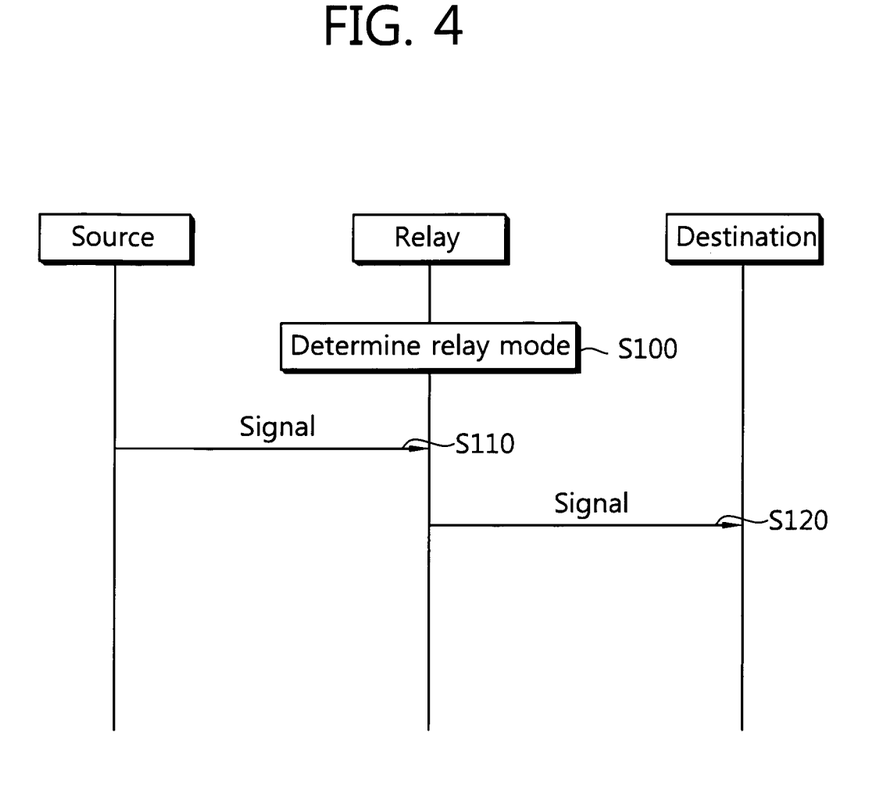
FIG. 4 is a flowchart showing a method of operating a relay station in accordance with an embodiment of the present invention.

FIG. 4 is a flowchart showing a method of operating a RS in accordance with an embodiment of the present invention.

Referring to FIG. 4, a RS determines a relay mode according to the QoS requirements of traffic (S100). The QoS requirements of traffic, for example, the requirements of time delay may vary depending on the type of traffic. That is, since control information or a voice signal is traffic that needs to be transmitted rapidly, it may be transmitted in the AF mode. Since e-mail is traffic that needs to be transmitted correctly rather than being transmitted rapidly, it may be transmitted in the DF mode. Further, when several RSs exist between a source station and a destination station, the fact that time delay is increased during a relay process may be further taken into consideration. Accordingly, even when pieces of traffic have the same QoS requirements, the AF mode or the DF mode may be determined depending on the number of RSs existing between the source station and the destination station. Such decision of the relay mode according to the QoS requirements may be changed dynamically with respect to several packets belonging to one piece of traffic. For example, in the case in which traffic is instantly congested in traffic whose amount of data varies every point of time, such as real-time motion pictures, corresponding packets may be transmitted temporally in the AF mode.

The RS receives a signal from a source station (S110) and transmits the signal to a destination station in the relay mode determined in the step S100 (S120).

Although it is shown that the relay mode is determined before the signal is received from the source station, it is an exemplary purpose only. The relay mode may be determined after the signal is received from the source station.

Figure 5:
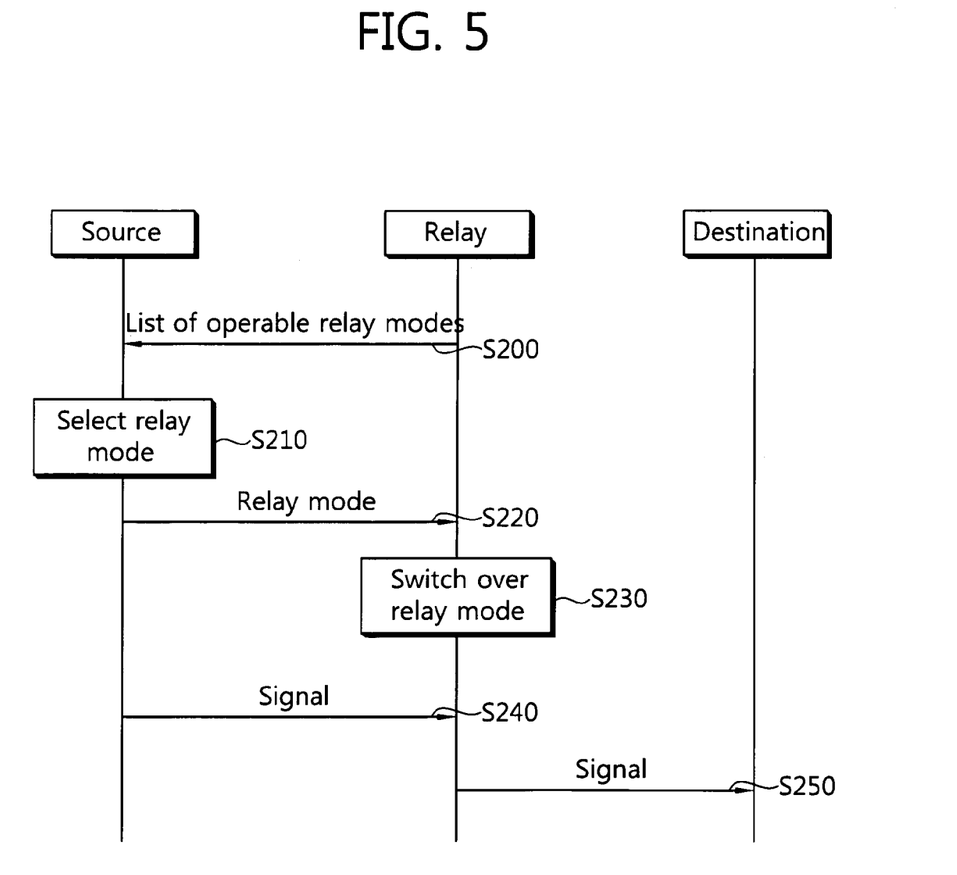
FIG. 5 is a flowchart showing a method of operating a relay station in accordance with another embodiment of the present invention.

FIG. 5 is a flowchart showing a method of operating a RS in accordance with another embodiment of the present invention.

Referring to FIG. 5, a RS informs a source station of a list of operable relay modes (S200). The source station determines one of the operable relay modes in the list as a relay mode by considering the QoS requirements of traffic (S210). The method of determining a relay mode based on the QoS requirements of traffic, which is illustrated in the step S100 of FIG. 4, may be applied to this embodiment of FIG. 5.

The source station informs the RS of the determined relay mode (S220). The RS switches to the relay mode (S230). The source station may inform the RS of a point of time at which a MS enters a network, a point of time at which traffic connection is set up, or a relay mode determined whenever a packet is transmitted.

The RS receives a signal from the source station (S240). The RS transmits the signal to a destination station in the relay mode switched in the step S230 (S250).

Although it is shown that the source station determines the relay mode, it is not limited thereto. The RS may inform the destination station of a list of operable relay modes, and the destination station may determine the relay mode.

Since a relay mode is determined by considering the QoS requirements of traffic, communication can be performed according to an adequate relay mode depending on various QoS conditions.

<Relay Mode Based on the Number of Times in which Attempts are Made to Transmit a Packet>

A RS may determine a relay mode depending on the number of times in which attempts are made to transmit a packet. For example, it is assumed that the RS transmits a signal in the AF mode and the destination station fails to receive the signal. In this case, the failure of the transmission of the signal in the AF mode may mean that error may exist in the signal. Accordingly, if the RS retransmits the signal in the AF mode again, there is a possibility that the destination station may fail to receive the signal. Further, it is assumed that the RS transmits a signal in the DF mode and the destination station fails to receive or restore the signal. In this case, since the time has already been delayed much, time delay further increases if the RS retransmits the signal in to the DF mode.

Figure 6:
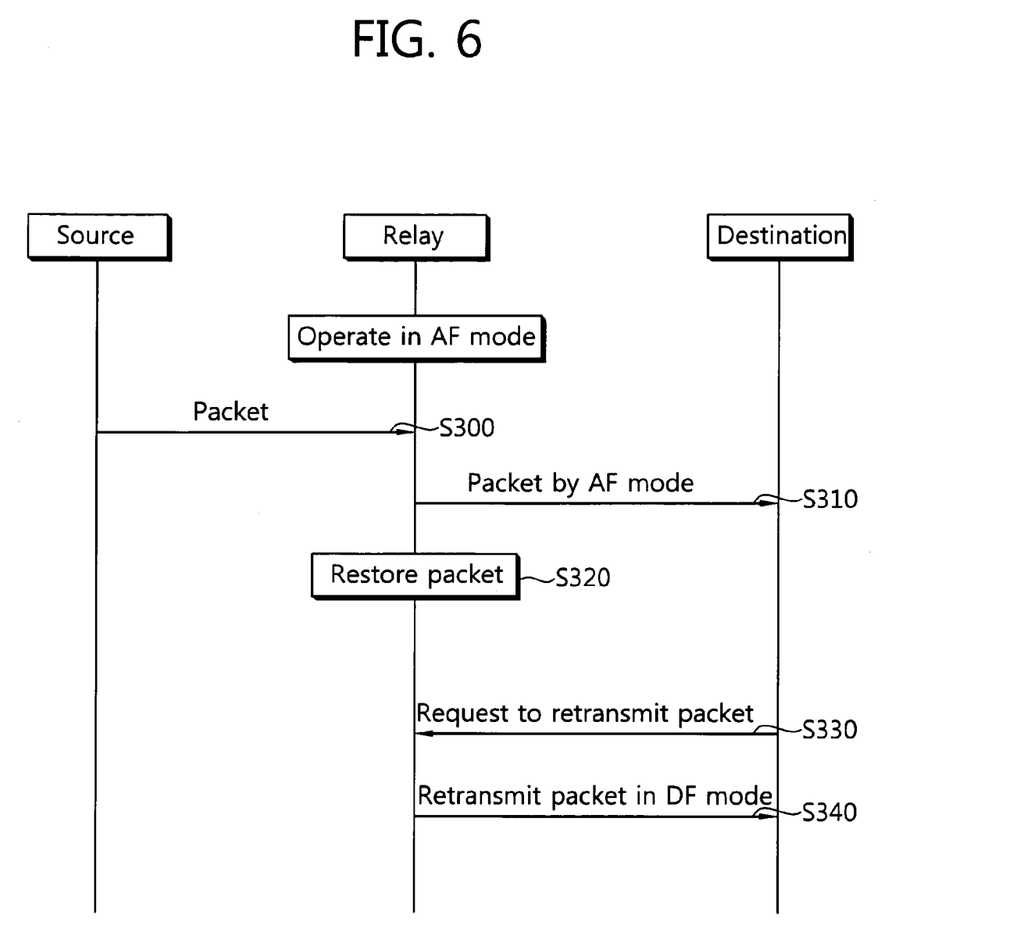
FIG. 6 is a flowchart showing a method of operating a relay station in accordance with still another embodiment of the present invention.

FIG. 6 is a flowchart showing a method of operating a RS in accordance with still another embodiment of the present invention. In this case, it is assumed that the RS operates in the AF mode initially.

Referring to FIG. 6, a RS receives a packet from a source station (S300). The RS relays the packet to a destination station in the AF mode (S310). The RS restores the packet (S320). The RS demodulates and decodes the packet and checks whether error exists in the packet.

If the destination station fails in the reception or restoration of the packet, the destination station transmits a request to retransmit the packet to the RS (S330). For example, the destination station may directly transmit the retransmission request to the RS. Alternatively, the destination station may transmit a message, indicating that the reception or restoration of a packet has failed, to the source station, and the source station may transmit the retransmission request to the RS. In the case in which, after transmitting a packet to the source station or the destination station in the step S310, the RS does not receive acknowledgement (ACK) therefrom within a certain period of time, the RS may consider that the destination station has failed in the reception or restoration of the packet.

The RS that has received the re-transmission request retransmits a packet, which has been restored in the step S320, to the destination station in the DF mode (S340). A coding and modulation scheme in the DF mode may be different from the coding and modulation scheme applied by the source station. The coding and modulation scheme applied to the retransmission packet may be decided by taking a channel characteristic, a transmission error rate, the quality of the packet transmitted in the AF mode, and so on into consideration.

After the RS transmits a packet to the destination station in the AF mode, the RS is prepared to retransmit a packet in the DF mode. Accordingly, when the destination station fails to restore or receive a packet, the retransmission of the packet can be accomplished while minimizing time delay due to decoding and encoding of the packet.

Figure 7:
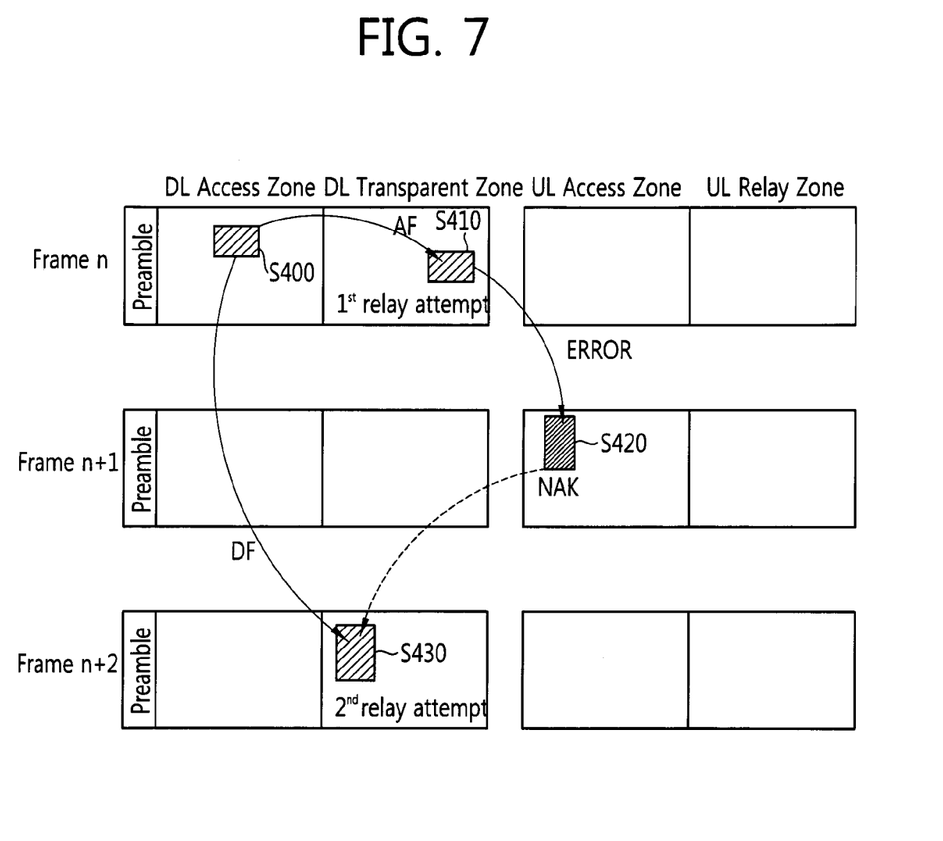
FIG. 7 is a diagram showing switch of a relay mode in accordance with an embodiment of the present invention.

FIG. 7 is a diagram showing switch of a relay mode in accordance with an embodiment of the present invention. It is assumed that a BS transmits a DL packet to a MS and a RS operates in the AF mode. In DL transmission, a source station may be the BS, and a destination station may be the MS.

Referring to FIG. 7, the BS transmits a packet to the RS through the DL access zone of a frame n (S400).

The RS that has received the packet transmits the packet to the MS through the DL transparent zone of a frame n in the AF mode, and demodulates and decodes the packet (S410). In this case, the RS can transmit the packet within the same frame without additional time delay because it transmits the packet in the AF mode.

Next, if the MS fails to receive the packet from the RS, the MS transmits non-acknowledgement (NAK) to the RS through the UL access zone of a frame n+1 (S420). The RS that has received NAK retransmits a packet, which has been demodulated and decoded in the step S410, to the MS through the DL transparent zone of a frame n+2 in the DF mode (S430).

Although it is shown that, in the step S420, the MS transmits NAK to the RS, it is an exemplary purpose only. The MS may transmit NAK to the BS. If the BS receives NAK, the BS may instruct the RS to retransmit a packet to the MS in the DF mode.

Referring to FIG. 7, since the RS first transmits a packet in the AF mode, time delay can be reduced. Further, if the RS fails to transmit a packet in the AF mode, it retransmits a packet in the DF mode, so the reliability of transmission can be maintained. Further, the RS transmits a packet in the AF mode and is then prepared to retransmit a packet in the DF mode. Accordingly, although the transmission of a packet in the AF mode fails, additional time delay can be minimized. Further, the RS knows signal information about a packet. Accordingly, in the case in which the packet is retransmitted in the DF mode, the transfer rate of a packet to be retransmitted can be decided based on the degree of reliability of a corresponding signal.

Figure 8:
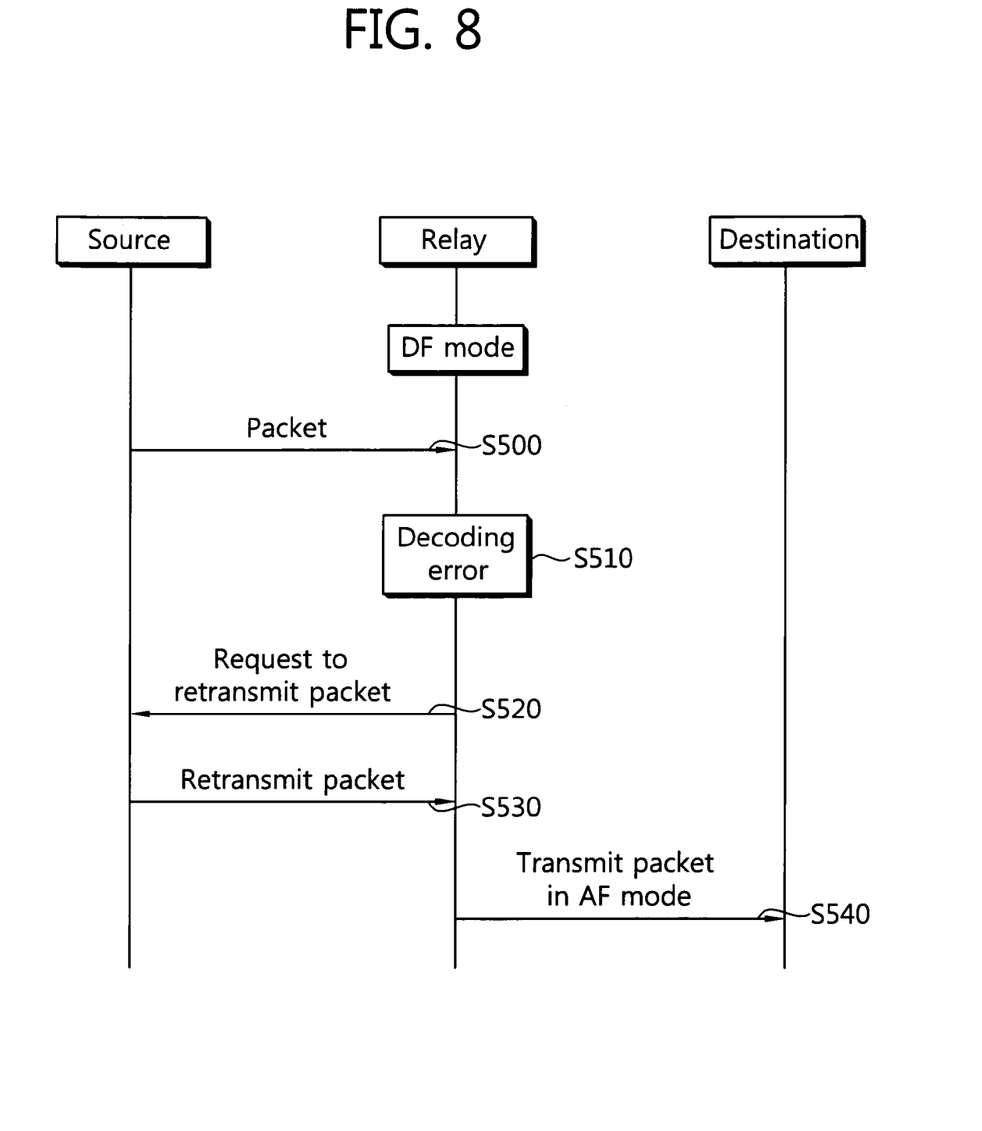
FIG. 8 is a flowchart showing a method of operating a relay station in accordance with an embodiment of the present invention.

FIG. 8 is a flowchart showing a method of operating a RS in accordance with an embodiment of the present invention. In this case, it is assumed that the RS operates in the DF mode.

Referring to FIG. 8, the RS receives a packet from a source station (S500) and then performs decoding and error check on the packet (S510) in order to transmit the packet to a destination station in the DF mode.

If, as a result of the check, error has been detected in the step S510, the RS determines that the reception of the packet has failed and then transmits a re-transmission request message with respect to a packet to the source station (S520).

The source station, which has received the re-transmission request message with respect to the packet in the step S520, retransmits the corresponding packet to the RS (S530), and the RS transmits the packet to the destination station in the AF mode (S540).

Referring to FIG. 8, the RS performs processes, such as decoding and error check, on a packet in order to transmit the packet to the destination station in the DF mode in the step S510. Accordingly, time delay is generated. If the packet received again in the step S530 is transmitted to the destination station in the DF mode in the step S540, time may be significantly delayed. Accordingly, in the case in which the RS retransmits a packet whose transmission has failed one more times, the RS may be made to operate in the AF mode, so additional time delay can be reduced.

Figure 9:
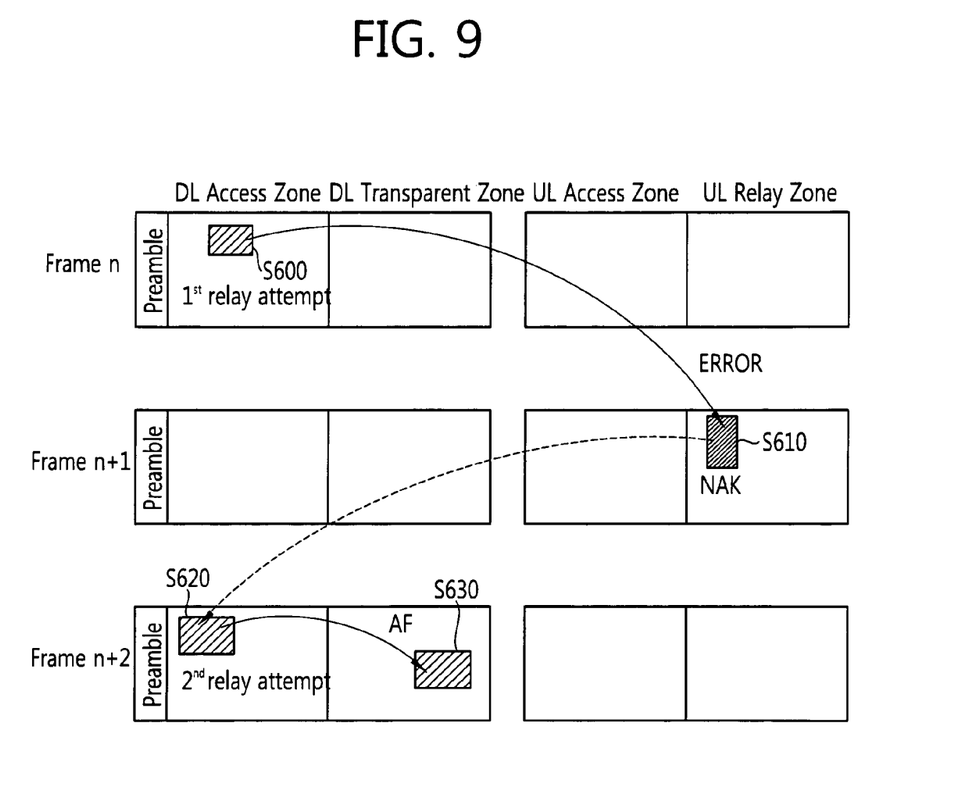
FIG. 9 is a diagram showing switch of a relay mode in accordance with an embodiment of the present invention.

FIG. 9 is a diagram showing switch of a relay mode in accordance with an embodiment of the present invention. In this case, it is assumed that a BS transmits a DL packet to a MS, and a RS operates in the DF mode. Since it is DL transmission, a source station is the BS and a destination station is the MS.

Referring to FIG. 9, the BS transmits a packet to the RS through the DL access zone of a frame n (S600).

In this case, it is assumed that the RS, which has received the packet, has found error in the packet in a process of performing demodulation, decoding, and error check on the packet in order to transmit the packet in the DF mode. The RS that has found error in the packet transmits NAK to the BS through the UL relay zone of a frame n (S610).

The BS that has received NAK retransmits a packet to the RS through the DL access zone of a frame n+2 (S620). At this time, a modulation and encoding method performed on the packet may differ from that performed on the packet, which is transmitted from the BS to the RS through the DL access zone of the frame n in the step S600.

The RS that has received the packet again from the BS retransmits the packet to the MS through a DL transparent zone of the frame n+2 in the AF mode (S630).

Referring to FIG. 9, time delay has already been generated in the attempt to transmit the packet in the DF mode. Accordingly, the RS complies with the AF mode when retransmitting the packet, so additional time delay can be reduced.

<Relay Mode Based on the Amount of Packets that Reach the Buffer of a RS>

The RS or the source station, or the destination station may determine a relay mode depending on the number of packets stacked in the buffer of the RS. When the number of packets stacked in the buffer of the RS is small, the wait time of the packets is not long, and so the packets can be transmitted in the DF mode. Further, when the amount of packets stacked in the buffer of the RS is many, the wait time of the packets is long, and so the packets can be transmitted rapidly in the AF mode. Further, when the amount of packets stacked in the buffer of the RS is many, some packets may be transmitted in the AF mode, and the remaining packets may be transmitted in the DF mode.

Figure 10:
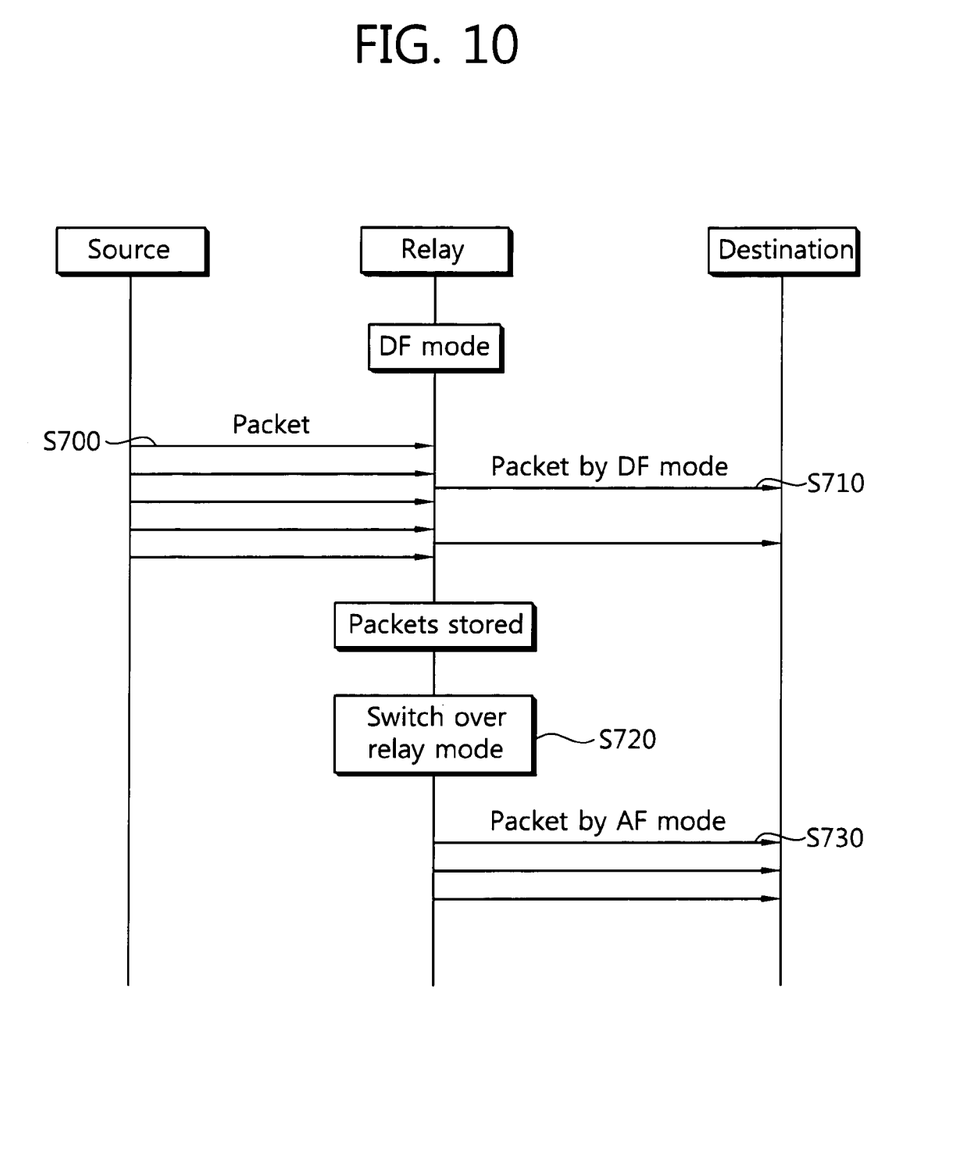
FIG. 10 is a flowchart showing a method of operating a relay station in accordance with an embodiment of the present invention.

FIG. 10 is a flowchart showing a method of operating a RS in accordance with an embodiment of the present invention. In this case, it is assumed that the RS operates in the DF mode.

Referring to FIG. 10, a source station consistently transmits packets to the RS (S700), and the RS transmits the packets to a destination station in the DF mode (S710). The RS performs decoding, encoding, etc. on the packets in order to process the packets in the DF mode. In this process, time delay is generated. If a speed in which the packets are received from the source station is faster than that in which the packets are transmitted to the destination station, the packets are stacked in the buffer of the RS.

If the amount of the packets stacked in the buffer of the RS reaches a specific amount or more, the RS switches a relay mode to the AF mode (S720), and the RS then transmits the packets, which are stacked in the buffer, to the destination station in the AF mode (S730). In this case, it is showing that the RS transmits all the packets stacked in the buffer in the AF mode, but this is only exemplary. For example, some packets may be transmitted in the AF mode, and the remaining packets may be transmitted in the DF mode. In the case in which only some packets are transmitted in the AF mode, the packets transmitted in the AF mode may be decided based on the priority of traffic, a channel status, QoS requirements, time delay of the packets in the buffer, and so on. The RS may transmit a list of the packets, which will be transmitted in the AF mode, to the source station or the destination station.

Referring to FIG. 10, if the amount of packets stacked in the buffer of the RS is a specific amount or more, the packets are transmitted to the destination station in the AF mode, so the state of the buffer can be stabilized.

Figure 11:
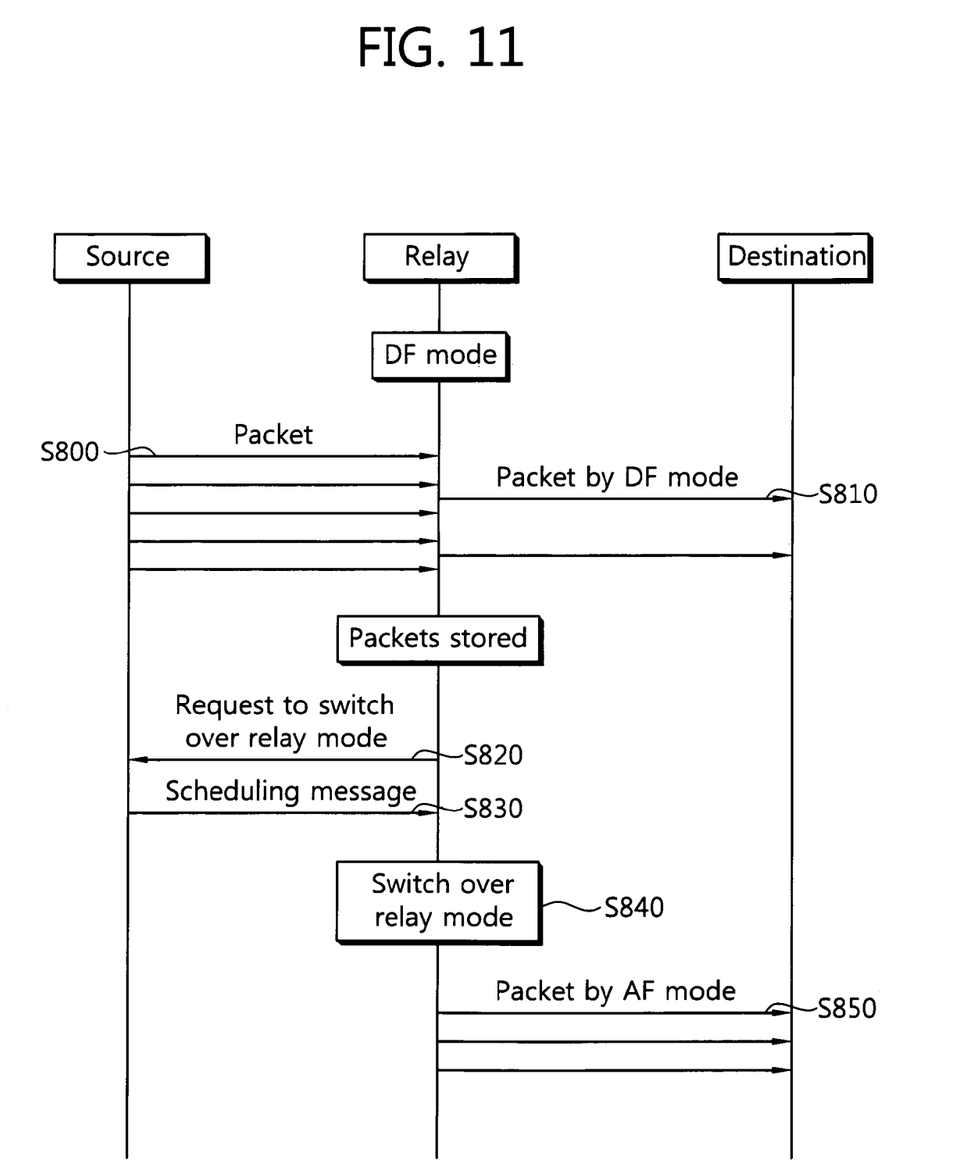
FIG. 11 is a flowchart showing a method of operating a relay station in accordance with an embodiment of the present invention.

FIG. 11 is a flowchart showing a method of operating a RS in accordance with an embodiment of the present invention. In this case, it is assumed that the RS operates in the DF mode.

Referring to FIG. 11, a source station consistently transmits packets to the RS (S800), and the RS transmits the packets to a destination station in the DF mode (S810). The RS performs decoding, encoding, etc. on the packets in order to process the packets in the DF mode. During this process, time delay is generated. If a speed in which the packets are received from the source station is faster than that in which the packets are transmitted to the destination station, the packets are stacked in the buffer of the RS.

If the amount of the packets stacked in the buffer of the RS reaches a specific amount or more, the RS sends a request message, requesting relay mode switchover, to the source station (S820). The source station that has received the request message sends a scheduling message to the RS (S830). The scheduling message may include contents, instructing that the packets stacked in the buffer of the RS be transmitted in the AF mode. Alternatively, the scheduling message may include contents, instructing that some of the packets stacked in the buffer of the RS be transmitted in the AF mode. In this case, the source station may select packets, which will be transmitted in the AF mode, by taking the priority of traffic, a channel status, QoS requirements, time delay of the packets in the buffer, and so on into consideration.

The RS that has received the scheduling message switches its relay mode to the AF mode (S840), and transmits the packets stacked in the buffer to the destination station in the AF mode (S850). At this time, in the case in which contents, instructing that some packets be transmitted in the AF mode, are included in the scheduling message received from the BS, the RS may transmit only some packets in the AF mode, but transmit the remaining packets in the DF mode.

Referring to FIG. 11, when a certain amount of packets are stacked in the buffer of the RS, packets are transmitted to a destination station rapidly in the AF mode, so the state of the buffer can be stabilized.

Figure 12:
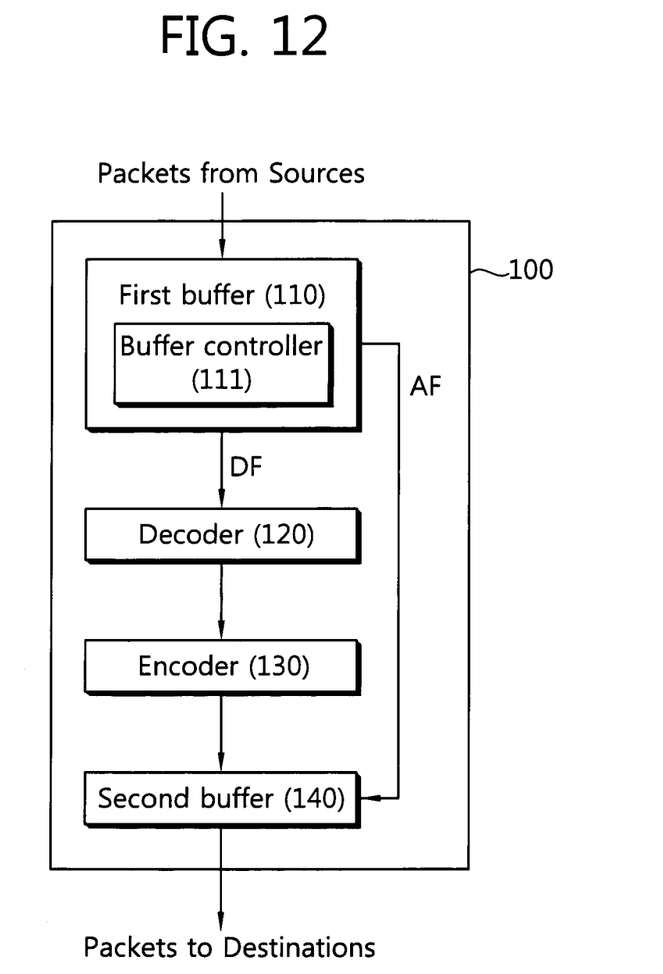
FIG. 12 is a diagram showing the internal structure of a relay station which can switch a relay mode in accordance with an embodiment of the present invention.

FIG. 12 is a diagram showing the internal structure of a RS which can switch a relay mode in accordance with an embodiment of the present invention.

Referring to FIG. 12, the internal structure of a RS 100 includes a first buffer 110, a decoder 120, an encoder 130, and a second buffer 140. The first buffer 116 is space for packets received from source stations, and includes a buffer controller 111. The second buffer 140 is space for packets to be transmitted to destination stations.

It is assumed that the RS 100 operates in the DF mode. Packets received from source stations are stored in the first buffer 110. The packets that have arrived at the first buffer 110 are transferred to the decoder 120 based on the sequence of arrival, the priority of a packet, and so on. The packets that have passed through the decoder 120 are transferred to the encoder 130, and the packets that have passed the encoder 130 are transferred to the second buffer 140. After the packets of the second buffer 140 are scheduled, they are transferred to destination stations.

In the case in which the RS 100 operates in the DF mode, delay time in the decoder 120 is long. If packets are received from source stations at a rate faster than that in which packets are processed in the decoder 120, packets are stacked in the first buffer 110 of the RS 100, so the size of the first buffer 110 increases.

If the amount of packets stacked in the first buffer 110 exceeds a certain amount, the RS 100 switches over a relay mode. In this case, the RS 100 itself may switch over a relay mode, or a source station or a destination station may instruct the RS to switch over its relay mode. The RS 100 may transmit a relay mode switchover request message to the source station or the destination station so that the source station or the destination station can instruct the RS to switch over its relay mode.

If the relay mode of the RS 100 is switched to the AF mode, the buffer controller 111 of the first buffer 110 may transfer packets, stacked in the first buffer 110, to the second buffer 140 in the AF mode. Alternatively, the buffer controller 111 may directly transfer some of the packets, stored in the first buffer 110, to the second buffer 140 in the AF mode and enable the remaining packets to experience the decoder 120 and the encoder 130 in the DF mode. In this case, the buffer controller 111 may select packets to be transmitted in the AF mode by taking the priority of traffic, a channel status, QoS requirements, time delay of the packets in the first buffer 110, and so on into consideration.

Referring to FIG. 12, when the amount of packets received from source stations increases, a relay mode rapidly switches over, and the packets are then transmitted. Accordingly, the state of a buffer can be stabilized, and time delay taken to transmit packets can be reduced.

The present invention may be implemented using hardware, software or a combination of them. In the hardware implementation, the present invention may be implemented using an application specific integrated circuit (ASIC), a digital signal processor (DSP), a programmable logic device (PLD), a field programmable gate array (FPGA), a processor, a controller, a microprocessor, other electronic unit or a combination of them, which is implemented and designed to perform the above-described function. In the software implementation, the present invention may be implemented using a module that performs the above-described function. Software may be stored in a memory unit and executed by a processor. A memory unit or a processor may adopt a variety of means that are well known to those skilled in the art.

Although the invention has been described in detail in connection with the preferred embodiments, a person having ordinary skill in the art will appreciate that the invention may be modified in various forms without departing from the spirit and scope of the present invention defined in the appended claims. Accordingly, a change of future embodiments of the present invention may not deviate from the technology of the present invention.

What is claimed is:

1. A relay station of a wireless communication system, comprising:
a buffer for storing packets received from a source station; and
a processor coupled with the buffer,
wherein the processor configured for:
transmitting a list of operable relay modes to a destination station;
receiving information indicating a relay mode from the destination station; and
transmitting a signal, received from the source station, to the destination station in the relay mode indicated by the information,
wherein the relay mode is selected, by the destination station, among the operable relay modes included in the list.

2. The relay station of claim 1, the processor is further configured for:
transmitting the information indicating the relay mode to the source station.

3. The relay station of claim 1, wherein the information indicating a relay mode is received periodically from the destination station.

4. The relay station of claim 1, wherein the list of operable relay modes comprises an amplify and forward (AF) mode and a decode and forward (DF) mode.

5. The relay station of claim 4, wherein if the amount of the packets stored in the buffer reaches a specific amount or more, the processor transmits the signal to the destination station in the AF mode.

* * * * *